(12) United States Patent
Yamamoto et al.

(10) Patent No.: US 11,279,265 B2
(45) Date of Patent: Mar. 22, 2022

(54) SYSTEM AND METHOD FOR COUNTERACTING VIBRATIONS WITHIN A VEHICLE

(71) Applicant: Honda Motor Co., Ltd., Tokyo (JP)

(72) Inventors: Stuart Masakazu Yamamoto, La Mirada, CA (US); Matias Monges, Los Angeles, CA (US); Joseph Anthony Alequin, Los Angeles, CA (US)

(73) Assignee: HONDA MOTOR CO., LTD, Tokyo (JP)

(*) Notice: Subject to any disclaimer, the term of this patent is extended or adjusted under 35 U.S.C. 154(b) by 355 days.

(21) Appl. No.: 16/123,397

(22) Filed: Sep. 6, 2018

(65) Prior Publication Data

US 2020/0079248 A1 Mar. 12, 2020

(51) Int. Cl.
B60N 2/24 (2006.01)
B60N 2/90 (2018.01)
B60N 2/00 (2006.01)

(52) U.S. Cl.
CPC ............... B60N 2/24 (2013.01); B60N 2/002 (2013.01); B60N 2/90 (2018.02)

(58) Field of Classification Search
CPC . B60N 2/24; B60N 2/90; B60N 2/002; B60N 2/976
See application file for complete search history.

(56) References Cited

U.S. PATENT DOCUMENTS

| 8,108,132 | B2 | 1/2012 | Reinke |
| 8,340,152 | B2 | 12/2012 | Jeanson et al. |
| 8,439,334 | B2 | 5/2013 | Deml et al. |
| 8,678,500 | B2 | 3/2014 | Lem et al. |
| 8,684,339 | B2 | 4/2014 | Deml et al. |
| 10,293,718 | B1* | 5/2019 | Llievski ................ B60N 2/501 |
| 2006/0155456 | A1* | 7/2006 | Kakuda ................... G01P 7/00 701/70 |
| 2012/0022292 | A1 | 1/2012 | Garcia et al. |
| 2012/0223554 | A1* | 9/2012 | Lem ...................... B60N 2/976 297/217.1 |

(Continued)

FOREIGN PATENT DOCUMENTS

WO 1988002912 4/1988

OTHER PUBLICATIONS

Nakano, K. et al. "Active Vibration Control of an Elevator Car Using Two Rotary Actuators." Journal of System Design and Dynamics 5 (2011): 155-163 (Year: 2011).*

Primary Examiner — James J Lee
Assistant Examiner — Shon G Foley
(74) Attorney, Agent, or Firm — Rankin, Hill & Clark LLP

(57) ABSTRACT

A system and method for counteracting vibrations within a vehicle that include determining a disposition of an occupant seated within a seat of the vehicle. The system and method also include determining at least one vibrational value associated with at least one vibration affecting the seat of the vehicle and determining at least one counteractive vibrational value and at least one vibrational element located within the seat of the vehicle to be actuated. The system and method further include actuating the at least one vibrational element to counteract the at least one vibration affecting the seat of the vehicle based on the at least one counteractive vibrational value.

18 Claims, 5 Drawing Sheets

(56) References Cited

U.S. PATENT DOCUMENTS

| | | | |
|---|---|---|---|
| 2015/0039138 A1* | 2/2015 | Kao | F16F 15/002 |
| | | | 700/280 |
| 2017/0030531 A1 | 2/2017 | Kitagawa et al. | |
| 2017/0120930 A1* | 5/2017 | Ling | G06F 3/017 |
| 2018/0006551 A1 | 1/2018 | Park et al. | |
| 2018/0160057 A1* | 6/2018 | Newman | G06Q 30/0645 |

* cited by examiner

SYSTEM AND METHOD FOR COUNTERACTING VIBRATIONS WITHIN A VEHICLE

BACKGROUND

Currently vehicles may be equipped with shocks, struts, and coil springs that may be provided in various configurations to minimize the effects of road vibrations when a vehicle travels on a bumpy roadway. Such road vibrations may cause bouncing and jolting during a traveling experience. A key limitation to these typical configurations are that they may only limit the effect of road vibrations generally within the vehicle. However, occupants seated within the seats of the vehicle may continue to feel the effects of road vibrations and additional vibrations from the operation and engine of the vehicle that may affect one or more portions of the vehicle based on the roadway on which the vehicle is traveling.

BRIEF DESCRIPTION

According to one aspect, a computer-implemented method for counteracting vibrations within a vehicle that includes determining a disposition of an occupant seated within a seat of the vehicle. The computer-implemented also includes determining at least one vibrational value associated with at least one vibration affecting the seat of the vehicle and determining at least one counteractive vibrational value and at least one vibrational element located within the seat of the vehicle to be actuated. The computer-implemented method further includes actuating the at least one vibrational element to counteract the at least one vibration affecting the seat of the vehicle based on the at least one counteractive vibrational value.

According to another aspect, a system counteracting vibrations within a vehicle that includes a memory storing instructions when executed by a processor cause the processor to determine a disposition of an occupant seated within a seat of the vehicle. The instructions also cause the processor to determine at least one vibrational value associated with at least one vibration affecting the seat of the vehicle and determine at least one counteractive vibrational value and at least one vibrational element located within the seat of the vehicle to be actuated. The instructions further cause the processor to actuate the at least one vibrational element to counteract the at least one vibration affecting the seat of the vehicle based on the at least one counteractive vibrational value.

According to still another aspect, non-transitory computer readable storage medium storing instructions that when executed by a computer, which includes a processor perform a method that includes determining a disposition of an occupant seated within a seat of a vehicle. The method also includes determining at least one vibrational value associated with at least one vibration affecting the seat of the vehicle and determining at least one counteractive vibrational value and at least one vibrational element located within the seat of the vehicle to be actuated. The method further includes actuating the at least one vibrational element to counteract the at least one vibration affecting the seat of the vehicle based on the at least one counteractive vibrational value.

DETAILED DESCRIPTION

Figure 1:
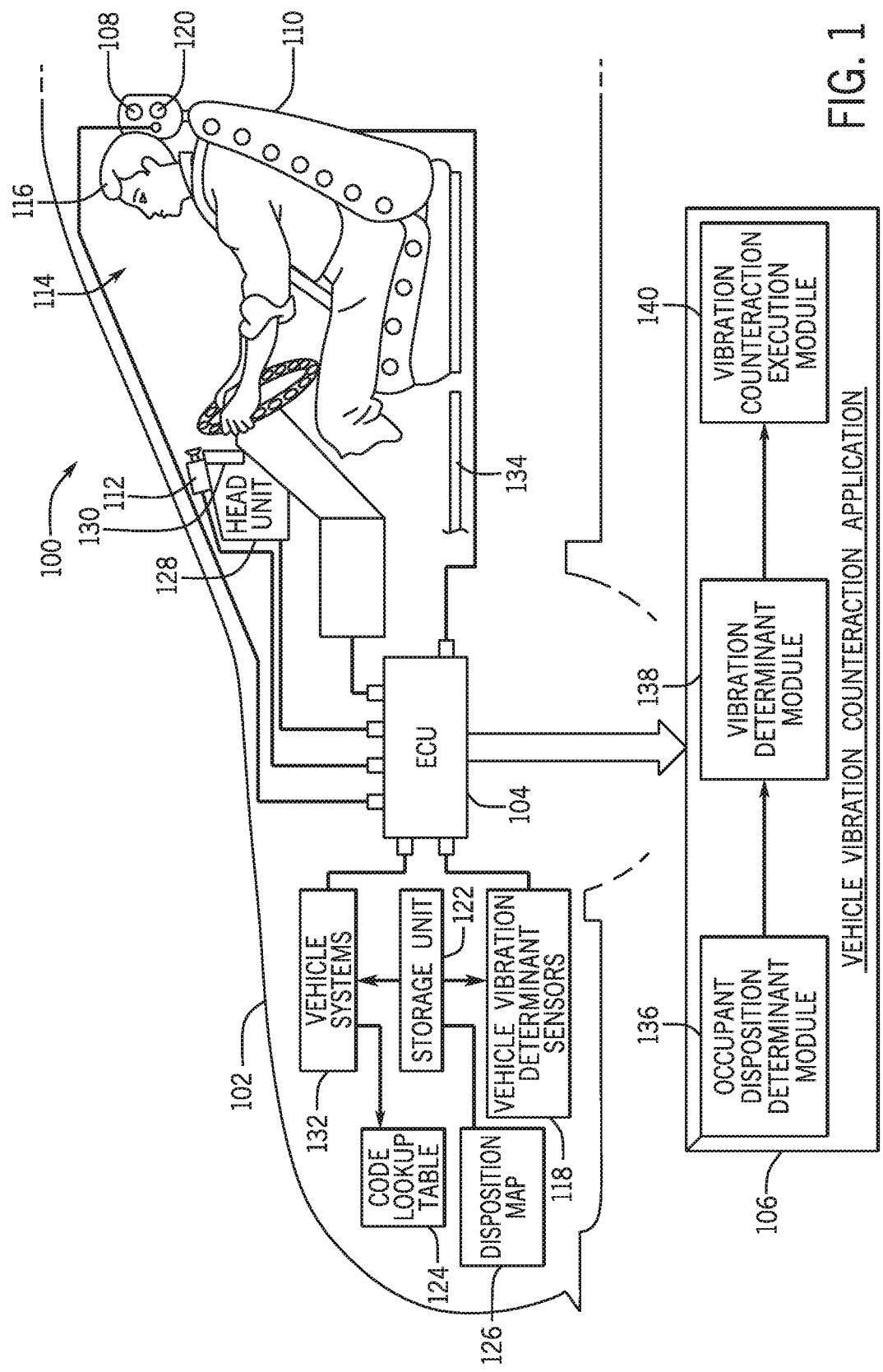
FIG. 1 is a schematic view of an operating environment for counteracting vehicular and/or road vibrations within a vehicle according to an exemplary embodiment.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, and a set of data stores and/or methods for accessing and/or manipulating those data stores. Some databases can be incorporated with a disk as defined above.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting the same, FIG. 1 is a schematic view of an operating environment 100 for counteracting vehicular (e.g., vibrations caused by an engine (not shown) of the vehicle 102 and/or operation of the vehicle 102 (turning, accelerating, braking)) and/or road vibrations (e.g., vibrations caused by bumps, potholes, unevenness of a roadway on which the vehicle 102 is traveling) within a vehicle 102 according to an exemplary embodiment. The components of the environment 100, as well as the components of other systems, hardware architectures, and software architectures discussed herein, may be combined, omitted, or organized into different architectures for various embodiments.

Generally, the vehicle 102 includes an electronic control unit (ECU) 104 that executes or accesses a vehicle vibration counteraction application 106 (vibration counteraction application 106). In an exemplary embodiment, the vibration counteraction application 106 may communicate with seat sensors 108 that are disposed within each of the seats 110 of the vehicle 102 and/or one or more cameras 112 that are disposed within an interior cabin (cabin) 114 of the vehicle 102. As discussed below, the sensors 108 and/or the camera (s) 112 may provide one or more signals that may include occupant disposition data that is associated with each occupant 116 seated within each respective seat 110 of the vehicle 102.

In particular, the occupant disposition data may indicate an occupant's weight and positions of one or more areas (e.g., body parts) of each occupant's body seated within each respective seat 110 (e.g., positions of the driver's back, the driver's arms, the driver's head, etc.) sensed/captured during a predetermined period of time (e.g., 30 minutes). Additionally, the vibration counteraction application 106 may communicate with vehicle vibration determinant sensors (vibration determinant sensors) 118 that may provide vibration data generally associated with the vehicle 102 and one or more seats 110 of the vehicle 102 that is sensed during the predetermined period of time.

As discussed below, the vibration counteraction application 106 may evaluate the data associated with the disposition of each occupant 116 seated within each respective seat 110 of the vehicle 102. The application 106 may additionally analyze vibration data associated with sensed vibrations that are sensed over the predetermined period of time. In one or more embodiments, the vibration counteraction application 106 may determine one or more vibrational elements 120 within each of the respective seats 110 of the vehicle 102 to be actuated at one or more levels to provide a counteracting vibrational force to remove the effects of the vibrations on each of the occupants 116 of the respective seats 110 of the vehicle 102.

The application 106 may thereby send one or more commands to the ECU 104 to control one or more of the vibrational elements 120 at one or more regions 202-216

(shown in FIG. 2) of each of the seats 110 of the vehicle 102. The one or more vibrational elements may be actuated to operate at one or more levels (e.g., frequencies, intensities, partially actuated, fully actuated) that may be utilized to counteract the vehicular vibrations and/or road vibrations so that these vibrations may not be sensed (e.g., felt) by the occupant(s) 116 seated within each of the seat(s) 110 of the vehicle 102.

With reference to the components of the vehicle 102, the ECU 104 may include internal processing memory (not shown), an interface circuit (not shown), and bus lines (not shown) for transferring data, sending commands, and communicating with components of the vehicle 102 and the vibration counteraction application 106. The ECU 104 may also include a communications device (not shown) for sending data internally in the vehicle 102 and externally to connected devices.

The communication device included within the ECU 104 may be capable of providing wired or wireless computer communications utilizing various protocols to send/receive electronic signals internally to/from components of the vehicle 102. Additionally, the communication device of the ECU 104 may be operably connected for internal computer communication via a bus (e.g., a Controller Area Network (CAN) or a Local Interconnect Network (LIN) protocol bus) to facilitate data input and output between the ECU 104 and the components of the vehicle 102.

The ECU 104 may be operably connected to a storage unit 122 that may store one or more operating systems, applications, associated operating system data, user interfaces, and the like that are executed by the ECU 104. In an exemplary embodiment, the storage unit 122 may store data (e.g., executable data files) that are associated with the vibration counteraction application 106 to be executed by the ECU 104.

In one embodiment, the storage unit 122 may be utilized by the application 106 to store a code lookup table 124 that stores one or more predetermined code values that correspond to the positional parameters pertaining to positions of one or more areas of the occupant's body and values associated with the occupant's weight (as determined from sensor data). As discussed below, the application 106 may access the code lookup table 124 to determine predetermined code values that correspond to the positions and/or the values associated with the weight applied to each of the regions 202-216 of the seat(s) 110 by the occupant(s) 116 seated within the seat(s) 110.

The storage unit 122 may also be utilized by the application 106 to store a disposition map 126 that may include data that maps the predetermined code values to one or more (pre-stored) dispositions (e.g., seated position and weight applied toward each region of each seat 110) associated with each occupant's body. In other words, the disposition map 126 may be utilized to determine the disposition of the occupant(s) 116 within the seat(s) 110 of the vehicle 102 based on data represented by the predetermined code values pertaining to positions of one or more areas of the occupant's body and values associated with the occupant's weight. As discussed below, the disposition of the occupant 116 may be utilized by the application 106 to determine one or more vibrational elements to be actuated in one or more levels to counteract the vehicular vibrations and/or road vibrations.

In one embodiment, the ECU 104 may be operably connected to a head unit 128 that may access the one or more applications and operating systems that are executed by the ECU 104. The head unit 128 may include a display unit 130 that may be positioned to present one or more user interfaces to the occupant(s) 116 seated within the seat(s) 110 of the vehicle 102. In some configurations, the display unit 130 may include a touch screen display (not shown) that may receive touch based user inputs from the occupant(s) 116 that may apply to the one or more user interfaces that are presented via the display unit 130.

In one or more embodiments, the display unit 130 may be utilized to present one or more user interfaces associated with the vibration counteraction application 106 that may allow the occupant(s) 116 to enable or disable vibration counteraction. The vibration counteraction may be enabled by the occupant(s) 116 to allow the application 106 to automatically provide the counteractive vibrations to vehicular and/or road vibrations that is directed to one or more regions of the seat(s) 110 to counteract the sensing of vibrations experiences by the occupant(s) 116. In some embodiments, the display unit 130 may be also utilized to present one or more user interfaces associated with the application 106 that may allow the occupant(s) 116 to selectively enable the application 106 to counteract particular levels of vehicular and/or road vibration at one or more regions of the seat(s) 110 of the vehicle 102.

Figure 2:
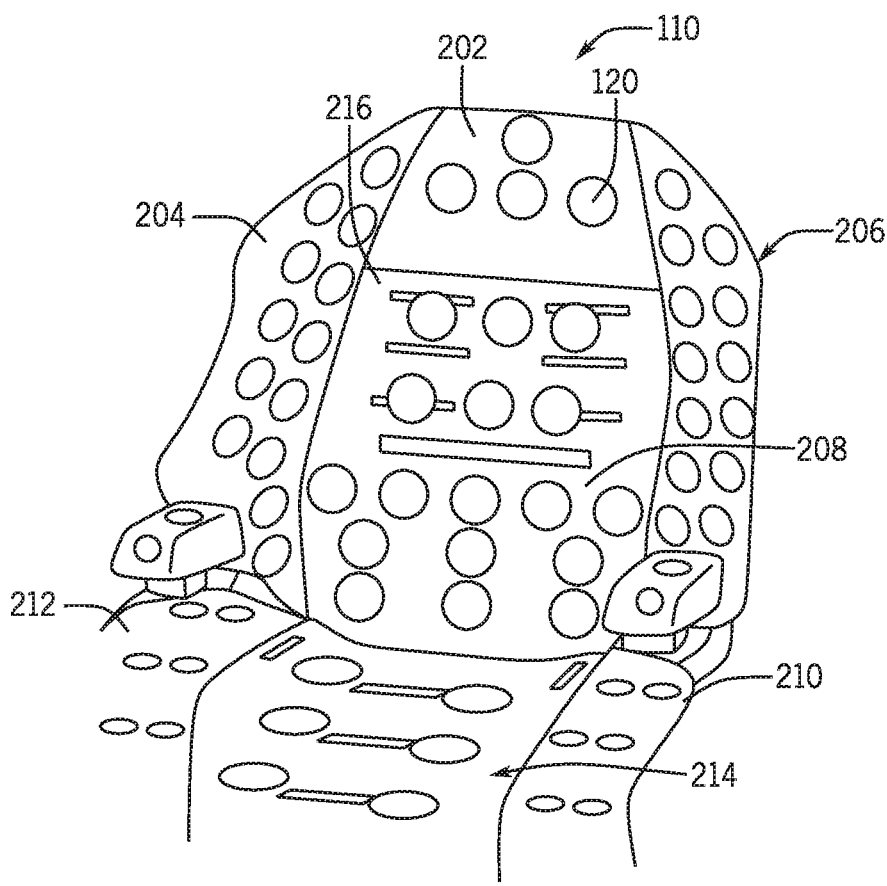
FIG. 2 is an illustrative view of vibrational elements located within seat(s) of the vehicle according to an exemplary embodiment.

FIG. 2 is an illustrative view of the vibrational elements 120 located within the seat(s) 110 of the vehicle 102 according to an exemplary embodiment. In one embodiment, the vibrational elements 120 may include respective motors (not shown) that each include a processing unit (not shown) that is operably connected to send and receive data to/from the ECU 104. As discussed below, the ECU 104 and/or the vibration counteraction application 106 may send commands to one or more of the vibrational elements 120 to be actuated to provide one or more levels of counteractive vibrations.

In one or more configurations, the vibrational elements 120 may include haptic devices that are configured as, but may not be limited to, eccentric rotating mass (ERM) elements, linear resonant actuators elements, air filled elements, liquid filled elements, and the like. In one embodiment, the vibrational elements 120 may be utilized to provide various types of vibrations (e.g., counteractive vibrations) in various manners and in various intensity levels to counteract vehicular and/or road vibrations.

As shown in the illustrative view of FIG. 2, the vibrational elements 120 may be located (disposed) at one or more regions 202-216 of the seat(s) 110 that are utilized by the application 106 to provide counteractive vibrations towards one or more of the regions 202-216 of the seat(s) 110 based on one or more vibrational values associated with the vehicular and/or road vibrations. It is contemplated that the application 106 may utilize any number of regions in addition to or in lieu of the regions 202-216 that are provided at one or more portions of each of the seats 110 of the vehicle 102.

Referring again to FIG. 1, in one embodiment, the ECU 104 may be operably connected to a plurality of vehicle systems 132. The plurality of vehicle systems 132 may include, but may not be limited to, (individual vehicle systems not shown), a vehicle audio system, a vehicle lighting system, a vehicle HVAC system, a vehicle infotainment system, and the like. In some embodiments, the vibration counteraction application 106 may be configured to control one or more of the plurality of vehicle systems 132 to be utilized in conjunction with the actuation of one or more of the vibrational elements 120 disposed within one or more of the seats 110 of the vehicle 102.

In some embodiments, the vibrational elements 120 may be associated with audio elements (not shown) (e.g., speakers) that may be disposed within and/or around the seats 110 of the vehicle 102. The vibration counteraction application 106 may be configured to control the vehicle audio system of the plurality of vehicle systems 132 to send one or more signals to the audio elements to provide noise-cancelling audio within the vehicle 102. The noise-cancelling audio may be provided to counteract sound associated with the vehicular and/or road vibrations within the vehicle 102 that may be provided in conjunction with the actuation and operation of one or more vibrational elements 120 disposed within the seat(s) 110 of the vehicle 102. The utilization of the audio elements in conjunction with the one or more vibrational elements 120 may provide a comprehensive counteractive experience to counteract the sensing and the hearing of sounds associated with the vehicular vibrations and/or road vibrations.

With particular reference to the seat sensors 108, the seat sensors 108 may be configured on one or more sensor pads (not shown) that may be included within one or more regions 202-216 of each of the seats 110 of the vehicle 102. In an additional embodiment, the sensor pad(s) may be included within one or more areas of the cabin 114 that are in close proximity to each of the seats 110. For instance, the one or more sensor pads that include the sensors 108 may be located within a floor panel 134 that is located adjacent to the seat 110 or an arm rest (not shown) of a door (not shown) adjacent to the seat 110. In one or more configurations, the sensor pad(s) may be included under a layer of covering/paneling (e.g., leather/cloth covering, plastic/wood/aluminum paneling) that is provided within numerous areas of the cabin 114. The sensors 108 may be positioned/disposed in various types of patterns on the sensor pad(s) to capture sensor data that is provided to the vibration counteraction application 106.

In one or more embodiments, the seat sensors 108 may include, but may not be limited to, capacitive touch sensors, proximity sensors, weight sensors, vibration sensors, and the like that are configured to sense data associated with the occupant 116 seated within each respective seat 110 of the vehicle 102. As discussed below, the seat sensors 108 may also be configured as the vibration determinant sensors 118 that may sense vibrations affecting each of the seats 110 of the vehicle 102 and/or a chassis (not shown) of the vehicle 102. In particular, the seat sensors 108 may be configured to sense the position and the shifting of weight of one or more areas of the occupant's body within each seat of the vehicle 102. For example, the seat sensors 108 may be configured to sense a seated position of an occupant within one of the seats 110 of the vehicle 102 as the weight applied to one or more regions 206-216 of the seat as the occupant 116 is seated within the seat 110 and possibly shifts their weight within the seat 110.

As an illustrative example, capacitive sensors and weight sensors may be used to determine areas of the driver's body that may be touching regions 202-216 of the seat 110 and a respective weight that is being applied towards the respective regions 202-216 of one of the seats 110. In one embodiment, upon the sensing the positions and weight associated to one or more areas of each occupant's body, the seat sensors 108 of the respective seat 110 may output and communicate sensor data to the ECU 104 and the vibration counteraction application 106.

In an exemplary embodiment, the ECU 104 may also be operably connected to one or more of the cameras 112 that may be disposed within one or more portions of the cabin 114 of the vehicle 102. The camera(s) 112 may be configured to capture one or more images/video of the cabin 114 including the seats 110 of the vehicle 102 to ensure that images/video of the occupant(s) 116 may be captured as the occupant(s) 116 is seated within the seat(s) 110. In one embodiment, upon the camera(s) 112 capturing one or more images/video, the camera(s) 112 may be configured to execute image logic to determine the positions of one or more areas of each occupant's body within the respective seat 110.

In particular, the image logic may be executed by the camera(s) 112 to output image data to the ECU 104 and/or the vibration counteraction application 106 that includes data associated with the positions of one or more areas of each occupant's body (e.g., head, torso, thighs, hips) as the occupant(s) 116 is seated within the seat 110. As discussed below, the vibration counteraction application 106 may aggregate data provided by the camera(s) 112 with sensor data provided by the seat sensors 108 to determine the disposition of the occupant(s) 116 seated within the seat(s) 110.

In an additional embodiment, the image logic may also be utilized to determine a driver alertness level for an occupant 116 seated within a driver seat (not shown) of the vehicle 102. The driver alertness level may be based on eye movement data, eye gaze data, and/or the positions of one or more areas of the occupant's body. The application 106 may control one or more of the vibrational elements 202 to provide vibrational tactile feedback as an alert that is used to notify the occupant (driver) based on a low driver alertness level (e.g., lower than a predetermined threshold).

In an exemplary embodiment, the ECU 104 is additionally operably connected to the vibration determinant sensors 118. The plurality of vibration determinant sensors 118 may include, but may not be limited to, numerous types of vibration sensors, road noise sensors, engine noise sensors, shock sensors, speed sensors, accelerometers, magnetometers, gyroscopes, brake force sensors, wheel speed sensors, wheel turning angle sensors, yaw rate sensors, transmission gear sensors, RPM sensors, and the like (individual sensors not shown) that may sense vehicular vibrations and road vibrations that may affect one or more of the seats 110 and the chassis of the vehicle 102.

In one or more embodiments, one or more of the seat sensors 108 of the vehicle 102 may also be configured as vibration determinant sensors 118. In particular, the one or more seat sensors 108 configured as vibration determinant sensors 118 may be configured to provide vibration data associated with vehicular vibrations and/or road vibrations that may affect one or more regions 202-216 of one or more of the seats 110 of the vehicle 102.

In one embodiment, the vibration data may be outputted as one or more values (e.g., numeric levels) that may be analyzed by the application 106 to determine vehicular vibrations that may affect the chassis and one or more particular seats 110 of the vehicle 102 at one or more particular regions 202-216 of the respective seats 110 based on vibrations caused by the engine of the vehicle 102 and/or operation of the vehicle 102. Additionally, the vibration data may also be analyzed by the application 106 to determine road vibrations that are associated with bumps, potholes, unevenness of a roadway on which the vehicle 102 is traveling that may affect the chassis and one or more particular seats 110 of the vehicle 102 at one or more particular regions 202-216 of the respective seats 110.

As discussed below, upon outputting vibration data, the vibration determinant sensors 118 may communicate the vibration data to the ECU 104 and the vibration counteraction application 106. The application 106 may thereby analyze the vibration data and may determine one or more vibrational values associated with one or more vehicular vibrations and/or road vibrations affecting each seat 110 of the vehicle 102.

II. The Vehicle Vibration Counteraction Application

The vibration counteraction application 106 and its functionality will now be described in more detail according to an exemplary embodiment. In one embodiment, the vibration counteraction application 106 may be stored on the storage unit 122 and executed by the ECU 104 and/or the head unit 128. In additional embodiments, the vibration counteraction application 106 may be stored on a memory (not shown) of an external device (not shown) (e.g., remote server) and executed by the ECU 104 and/or the head unit 128 of the vehicle 102 via a computer communication medium (e.g., remote network connection) between the ECU 104 and the external device.

In one or more embodiments, the vibration counteraction application 106 may include a plurality of modules 136-140 that may include, but may not be limited to, an occupant disposition determinant module 136 (occupant disposition module), a vibration determinant module 138, and a vibration counteraction execution module (counteraction execution module) 140. It is to be appreciated that the vibration counteraction application 106 may include additional modules and/or sub-modules of the plurality of modules 136-140. As discussed below, each of the plurality of modules 136-140 may complete computing processing functions as the vibration counteraction application 106 is operating.

In one embodiment, the vibration counteraction application 106 may be automatically enabled to operate upon actuation of an accessory or ignition mode of the vehicle 102. In an additional embodiment, the vibration counteraction application 106 may be manually enabled to operate based on an enablement of the application 106 through the one or more interfaces associated with the application 106 (via the display unit 130 or other input device of the vehicle 102).

In an exemplary embodiment, the plurality of modules 136-140 may execute computer commands to provide counteractive vibrations to one or more regions 202-216 of each of the seats 110 of the vehicle 102 in which occupants 116 are determined to be seated based on data provided by the seat sensors 108 and/or one or more of the cameras 112.

In one embodiment, the occupant disposition module 136 may be configured to evaluate sensor data communicated by the seat sensors 108 disposed within each of the seats 110 of the vehicle 102. Additionally, the occupant disposition module 136 may be configured to evaluate image data provided by one or more cameras 112 of the vehicle 102. The occupant disposition module 136 may be configured to evaluate the sensor data and/or the image data to determine positions and weight associated with each occupant's body as seated within the respective seat 110 of the vehicle 102. As discussed below, the occupant disposition module 136 may utilize the code lookup table 124 and the disposition map 126 to determine the disposition of the occupant(s) 116 seated within the seat(s) 110 of the vehicle 102 for a predetermined period of time. Upon determining the disposition of the occupant(s) of the vehicle 102 for the predetermined period of time, the occupant disposition module 136 may communicate occupant disposition data to the counteraction execution module 140.

In one or more embodiments, the vibration determinant module 138 may be configured to receive vibration data from the vibration determinant sensors 118. The vibration determinant module 138 may be configured to analyze the vibration data and may determine one or more vibrational values associated with one or more vehicular vibrations and/or road vibrations affecting each seat 110 of the vehicle 102.

The one or more vibrational values may be included as a range of values that may represent vibration velocity, acceleration, and displacement that may pertain to each of the regions 202-216 of each of the seats 110 of the vehicle 102 and overall with respect to the chassis of the vehicle 102. In other words, the vibration determinant module 138 may be configured to determine one or more vibrational values that may pertain to one or more vibrations that may affect each of the one or more regions 202-216 of the one or more seats 110 of the vehicle 102 and the chassis of the vehicle 102 (e.g., generally vibrations that may be felt within one or more areas of the cabin 114 of the vehicle 102) as determined based on the vibration data received from the vibration determinant sensors 118.

Figure 3:
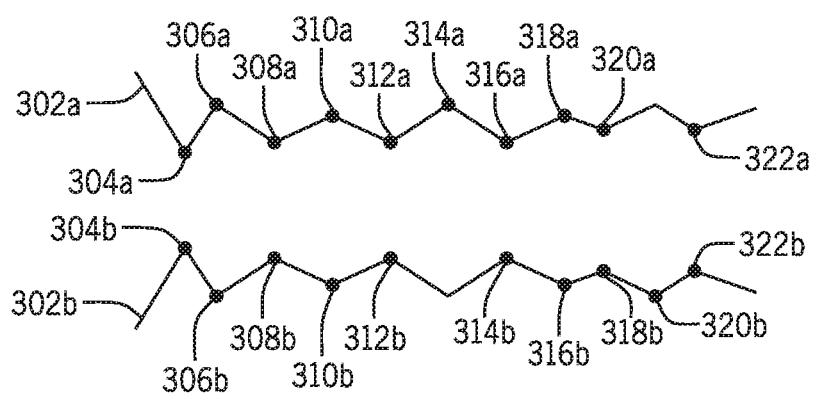
FIG. 3 illustrates a plurality of vibrational values and counteractive vibrational values that may be determined for a predetermined period of time according to an exemplary embodiment.

FIG. 3 illustrates a plurality of vibrational values and counteractive vibrational values that may be determined for a predetermined period of time according to an exemplary embodiment. As shown within a line graph 302a, a plurality of values (not shown) at a plurality of points in time 304a-322a may be determined during a predetermined period of time for each region 202-216 of each of the seats 110 of the vehicle 102. As discussed below, each of the plurality of vibrational values determined during a predetermined period of time for each region 202-216 of each of the seats 110 of the vehicle 102 and the chassis of the vehicle 102 (e.g., based on vibration data sensed by the seat sensors 108 located within the floor panel 134) may be communicated by the vibration determinant module 138 to the counteraction execution module 140 to be further evaluated.

In one or more embodiments, the counteraction execution module 140 may be configured to evaluate data associated with the plurality of vibrational values that may pertain to each of the regions 202-216 of each of the seats 110 of the vehicle 102 and the chassis of the vehicle 102 and may determine a plurality of counteractive vibrational values. The plurality of counteractive vibrational values may be a plurality of inverse values (e.g., of each of the respective vibrational values) that may each correspond to respective vibrational values. The counteraction execution module 140 may be configured to determine the plurality of counteractive vibrational values that may pertain to each of the regions 202-216 of each of the seats 110 of the vehicle 102 and the chassis of the vehicle 102 to counteract the vibrations sensed by the occupant(s) 116 seated within the seat(s) 110 of the vehicle 102.

With reference again to the illustrative example of FIG. 3, the line graph 302b represents a plurality of counteractive vibrational values (not shown) at a plurality of points in time 304b-322b that may correspond to vibrational values represented by the line graph 302a at a plurality of corresponding points in time 304a-322a. The plurality of counteractive vibrational values may be determined during the predetermined period of time for each region 202-216 of each of the seats 110 of the vehicle 102.

In one embodiment, upon determining the plurality of counteractive vibrational values, the vibration counteraction execution module 140 may be configured to evaluate the occupant disposition for each of the occupants of the vehicle 102, as communicated by the occupant disposition module 136. The vibration counteraction execution module 140 may determine one or more vibrational elements 120 to be actuated at one or more levels based on the counteractive vibrational values associated with each of the regions 202-216 of each of the seats 110, the chassis of the vehicle 102, and the occupant disposition of each of the occupants 116 seated within each of the respective seats 110 of the vehicle 102.

In an exemplary embodiment, the counteraction execution module 140 may communicate one or more commands to the ECU 104 of the vehicle 102 to actuate one or more (select) vibrational elements 120 based on the determination made by the module 140. The one or more vibrational elements may be actuated at one or more levels at one or more particular regions 202-216 of one or more of the seats 110 of the vehicle 102 to counteract the vehicular vibrations and/or road vibrations. Consequently, the vibrations are not sensed (felt) by the respective occupants 116 of the vehicle 102. In other words, the vehicular vibrations and/or road vibrations may be cancelled/negated out by the counteractive vibrations provided by the one or more vibrational elements 120 disposed within one or more regions 202-216 of the one or more seats of the vehicle 102 to thereby provide a smoother traveling experience for the respective occupants 116 of the vehicle 102.

Figure 4:
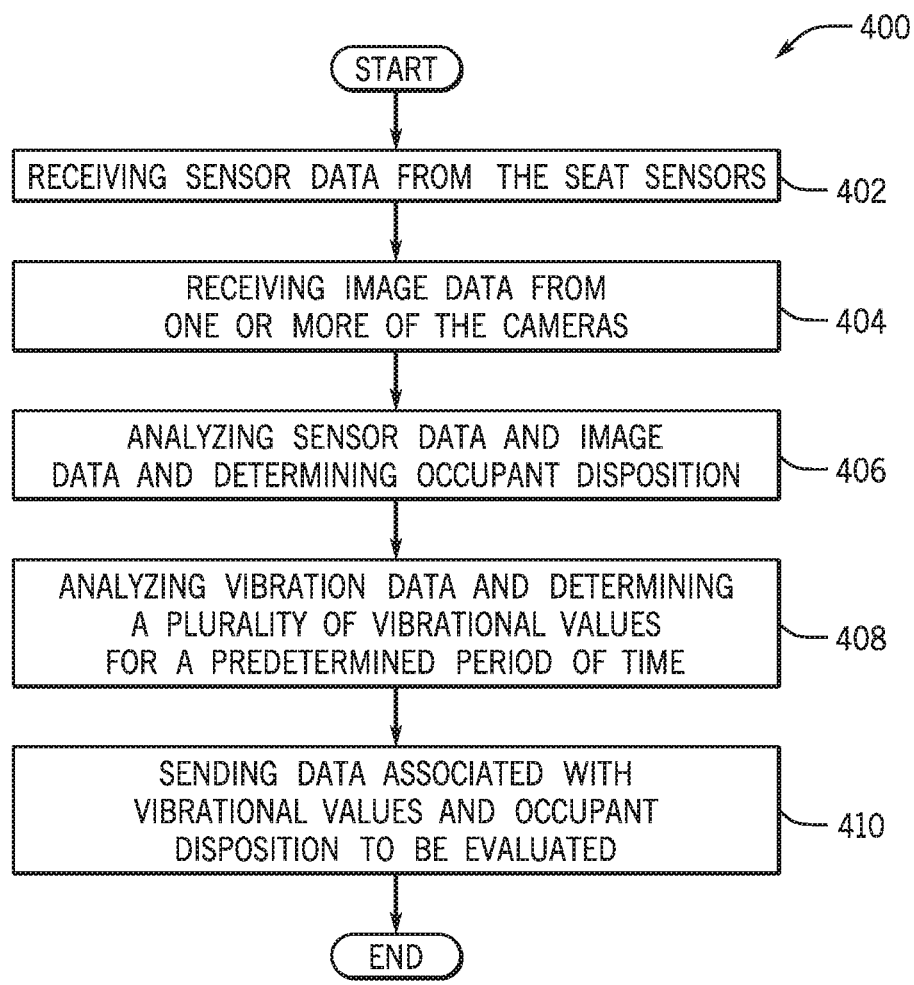
FIG. 4 is a process flow diagram of a method for determining an occupant disposition and a plurality of vibrational values according to an exemplary embodiment.

III. Exemplary Methods Executed by the Vehicle Vibration Counteraction Application FIG. 4 is a process flow diagram of a method 400 for determining an occupant disposition and a plurality of vibrational values according to an exemplary embodiment. FIG. 4 will be described with reference to the components of FIG. 1, though it is to be appreciated that the method 400 of FIG. 4 may be used with additional and/or alternative system components. The method 400 may begin at block 402, wherein the method 400 may include receiving sensor data from the seat sensors 108. In an exemplary embodiment, the seat sensors 108 may be configured to communicate sensor data with the occupant disposition module 136 upon sensing that an occupant 116 is seated within a respective seat 110 of the vehicle 102.

Upon sensing the seated occupant, the seat sensors 108 may be configured to sense the position and the shifting of weight of one or more areas of the occupant's body within each seat of the vehicle 102. For example, the seat sensors 108 may be configured to sense a seated position of an occupant 116 seated within one of the seats 110 of the vehicle 102 and the weight applied to one or more regions 202-216 of the seat as the occupant 116 is seated within the seat 110 and possibly shifts their weight within the seat 110. In one embodiment, upon receiving the sensor data for a predetermined period of time, the occupant disposition module 136 may access the storage unit 122 and store the sensor data on the storage unit 122 to be accessed to be further processed.

The method 400 may proceed to block 404, wherein the method 400 may include receiving image data from one or more of the cameras 112. In one embodiment, one or more of the cameras 112 that may be disposed within one or more portions of the cabin 114 of the vehicle 102 may be configured to capture one or more images/video of the cabin 114 including the seats 110 of the vehicle 102 to ensure that images/video of the occupant(s) 116 may be captured as the occupant(s) 116 is seated within the seat(s) 110.

In one embodiment, upon the camera(s) 112 capturing one or more images/video, the camera(s) 112 may be configured to execute image logic to output image data to the occupant disposition module 136. The image data may include data associated with the positions of one or more areas of each occupant's body as the occupant(s) 116 is seated within the seat(s) 110. In one embodiment, the occupant disposition module 136 may access the storage unit 122 and store the image data on the storage unit 122 to be accessed and processed.

The method 400 may proceed to block 406, wherein the method 400 may include analyzing sensor data and image data and determining occupant disposition. In one embodiment, the occupant disposition module 136 may access the sensor data and the image data from the storage unit 122 and may aggregate (via electronic processing) the image data provided by the camera(s) 112 with the sensor data provided by the seat sensors 108. The occupant disposition module 136 may access the storage unit 122 and store aggregated sensor-image data on the storage unit 122 to be accessed and further analyzed. In one embodiment, the occupant disposition module 136 may analyze the aggregated sensor-image data and may determine one or more positional parameter values that may correspond to one or more seated positions and/or the weight applied towards each of the regions 202-216 of each of the seats 110 of the vehicle 102 as sensed by the sensors 108 and/or captured by the camera(s) 112 of the vehicle 102.

Upon determining the one or more positional parameter values, the occupant disposition module 136 may access the code lookup table 124 on the storage unit 122 and may query the table 124 to retrieve one or more predetermined code values that correspond to the positional parameters that are associated with the position of each occupant's body within the respective seat 110 and the weight applied towards each of the regions 202-216 of each of the seats 110.

In particular, the predetermined code values may include specific character and/or numerical designations (e.g., binary code) that may be associated with particular positions of one or more areas of the occupant's body that may be touching regions 202-216 of the seat 110 and respective weight values that may be applied towards the respective regions 202-216 of each of the seats 110 of the vehicle 102. Upon querying the code lookup table 124, the occupant disposition module 136 may convert the positional parameters into the one or more corresponding predetermined code values as retrieved by the occupant disposition module 136 from the table 124.

In an exemplary embodiment, the occupant disposition module 136 may evaluate the predetermined code values and may rank the predetermined code values based on a description of the code value. The occupant disposition module 136 may access the disposition map 126 and may map one or more dispositions that pertain to the force applied by specific areas of each occupant's body that may being applied to each of the regions 202-216 of each of the seats 110 of the vehicle 102 based on the evaluation of the predetermined code values and the associated time durations. The mapped dispositions may be output as determined dispositions of the occupant(s) 116 for the predetermined period of time by the occupant disposition module 136.

The method 400 may proceed to block 408, wherein the method 400 may include analyzing vibration data and determining a plurality of vibrational values for a predetermined period of time. As discussed above, the vibration determinant sensors 118 may be configured to sense and provide vibration data. The vibration data may be communicated to the vibration determinant module 138. In one embodiment, the vibration data may be analyzed by the vibration determinant module 138 to determine vehicular vibrations that may affect the chassis and one or more particular seats 110 of the vehicle 102 at one or more particular regions 202-216 of the respective seats 110 based on vibrations caused by the engine of the vehicle 102 and/or operation of the vehicle 102. Additionally, the vehicle dynamic data may also be analyzed by the application 106 to determine road vibrations that are associated with bumps, potholes, unevenness of a roadway on which the vehicle 102 is traveling that may affect the chassis and one or more particular seats 110 of the vehicle 102 at one or more particular regions 202-216 of the respective seats 110.

Upon analyzing the vehicle data, the vibration determinant module 138 may determine one or more vibrational values. The one or more vibrational values may be associated with one or more vehicular vibrations and/or road vibrations affecting each particular region 202-216 of each seat 110 of the vehicle 102. As discussed, the one or more vibrational values may be included as a range of values that may represent vibration velocity, acceleration, and displacement that may pertain to each of the regions 202-216 of each of the seats 110 of the vehicle 102 and overall with respect to the chassis of the vehicle 102.

The method 400 may proceed to block 410, wherein the method 400 may include sending data associated with vibrational values and occupant disposition to be evaluated. In an exemplary embodiment, upon determining the occupant disposition of the occupant(s) 116 seated within the seat(s) 110 of the vehicle 102 for a predetermined period of time, the occupant disposition module 136 may communicate respective data pertaining to the disposition of the occupant(s) 116 to the counteraction execution module 140 to be further evaluated. Additionally, upon determining one or more of the vibrational values for the predetermined period of time, the vibration determinant module 138 may communicate respective data pertaining to the vibrational value(s) to the counteraction execution module 140 to be further evaluated.

Figure 5:
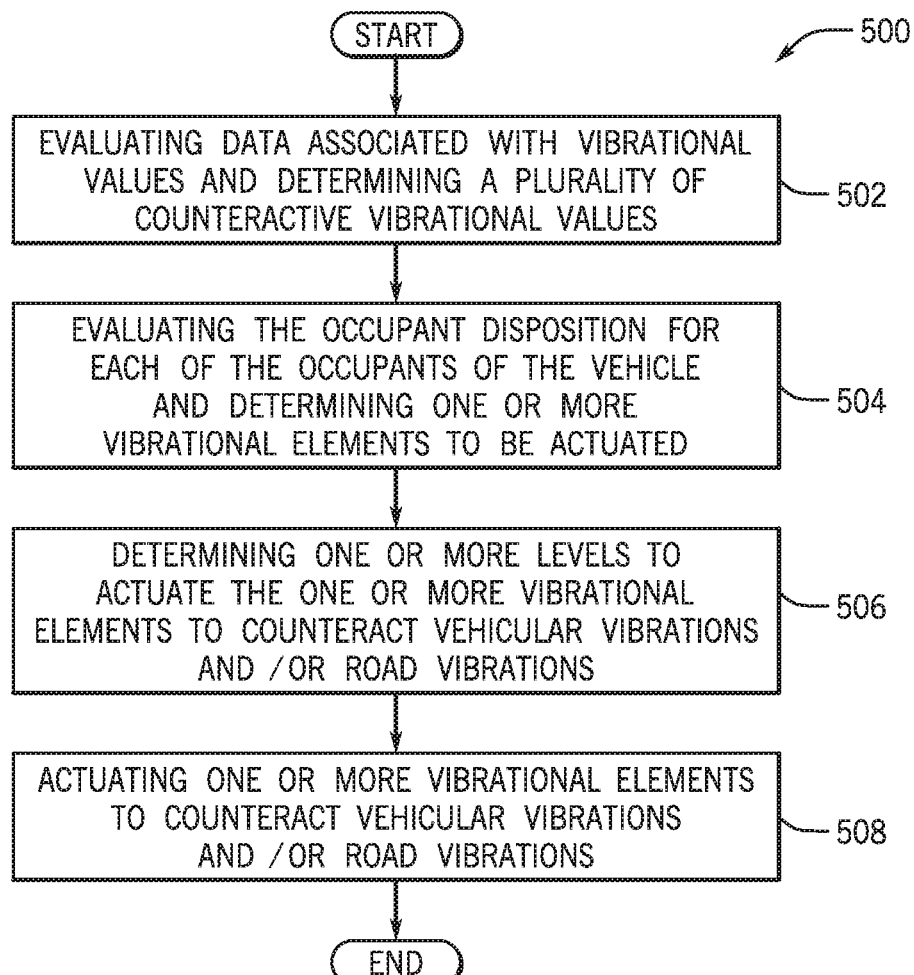
FIG. 5 is a process flow diagram of a method for actuation of one or more vibrational elements to counteract vehicular vibrations and/or road vibrations according to an exemplary embodiment.

FIG. 5 is a process flow diagram of a method 500 for actuation of one or more vibrational elements 120 to counteract vehicular vibrations and/or road vibrations according to an exemplary embodiment. FIG. 5 will be described with reference to the components of FIG. 1, though it is to be appreciated that the method 500 of FIG. 5 may be used with additional and/or alternative system components. The method 500 may begin at block 502 wherein the method 500 may include evaluating data associated with vibrational values and determining a plurality of counteractive vibrational values.

In an exemplary embodiment, the vibration counteraction execution module 140 may evaluate each of the vibrational values that represent vibration velocity, acceleration, and displacement that may specifically pertain to one or more of the regions 202-216 of one or more of the seats 110 of the vehicle 102 and the chassis of the vehicle 102. Upon evaluation of each of the one or more vibrational values, the counteraction execution module 140 may determine one or more corresponding counteractive vibrational values. The one or more counteractive vibrational values may include inverse values that may each correspond to respective vibrational values. The one or more counteractive vibrational values may pertain to each of the regions 202-216 of each of the seats 110 of the vehicle 102 and the chassis of the vehicle 102 to counteract the vibrations associated with the one or more corresponding vibrational values (communicated by the vibration determinant module 138) sensed by the occupant(s) 116 seated within the seat(s) 110 of the vehicle 102.

The method 500 may proceed to block 504, wherein the method 500 may include evaluating the occupant disposition for each of the occupants 116 of the vehicle 102 and determining one or more vibrational elements to be actuated.

In one or more embodiments, the counteraction execution module 140 may evaluate the dispositions of each of the occupants 116 seated within the respective seats 110 of the vehicle 102. Upon evaluating the dispositions of each of the occupants 116, the module 140 may determine one or more regions 202-216 of the respective seats 110 in which the one or more occupants 116 are seated that are located within a predetermined proximity of one or more portions of each occupant's body.

In other words, the counteraction execution module 140 may determine one or more regions 202-216 of each of the seats 110 of the vehicle 102 that may be located within a predetermined distance of particular areas of each occupant's body that may be touching regions 202-216 of the seat 110 and respective weight values that are being applied towards the respective regions 202-216 of each of the seats 110 of the vehicle 102. In one embodiment, the counteraction execution module 140 may additionally evaluate the one or more vibrational elements 120 that are located within the one or more determined regions 202-216 to determine one or more specific vibrational elements 120 to be actuated to provide counteractive vibrations that are specifically provided to one or more regions 202-216 of the one or more seats 110.

The method 500 may proceed to block 506, wherein the method 500 may include determining one or more levels to actuate the one or more vibrational elements 120 to counteract vehicular vibrations and/or road vibrations. In an exemplary embodiment, the vibration counteraction execution module 140 may further evaluate the occupant disposition for each of the occupants 116 of the vehicle 102 and may further determine if one or more of the counteractive vibrational values is to be adjusted based on an amount of weight that is applied to one or more regions 202-216 of the seat(s) 110 as the occupant(s) 116 is seated within the seat(s) 110 and possibly shifts their weight within the seat(s) 110.

In other words, the vibration counteraction execution module 140 may evaluate the counteractive vibrational values to determine if a requisite level of counteractive vibrational force is provided at one or more regions 202-216 of the seats 110 that may be heavily utilized (e.g., rested/leaned against) and/or touched by one or more areas of each of the occupant's body. If it is determined that a requisite level of counteractive vibrational force is not provided at one or more regions 202-216 of the seats 110 that may be more heavily utilized, the module 140 may adjust one or more respective counteractive vibrational values to provide a higher level of counteractive vibrational force. Accordingly, the counteraction execution module 140 may determine one or more levels to actuate the one or more vibrational elements 120 based on the counteractive vibrational values and the adjusted counteractive vibrational values associated with one or more of the vibrational elements 120 at one or more of the regions 202-216 of one or more of the seats 110 of the vehicle 102.

The method 500 may proceed to block 508, wherein the method 500 may include actuating one or more vibrational elements 120 to counteract vehicular vibrations and/or road vibrations. In an exemplary embodiment, the vibration counteraction execution module 140 may communicate one or more commands to the ECU 104 to control one or more of the vibrational elements 120 located within one or more of the seats 110 of the vehicle 102 to provide counteractive vibrations at one or more regions 202-216 of one or more seats 110 of the vehicle 102.

In another embodiment, the vibration counteraction execution module 140 may communicate one or more commands directly to one or more of the vibrational elements 120 disposed within one or more regions 202-216 of the seat(s) 110 to provide various types of counteractive vibrations at the one or more levels (as determined at block 506). The one or more vibrational elements 120 may consequently provide counteractive vibrations to counteract the vehicular vibrations and/or road vibrations that may be sensed by the occupant(s) 116 within each of the seat(s) 110 of the vehicle 102.

Figure 6:
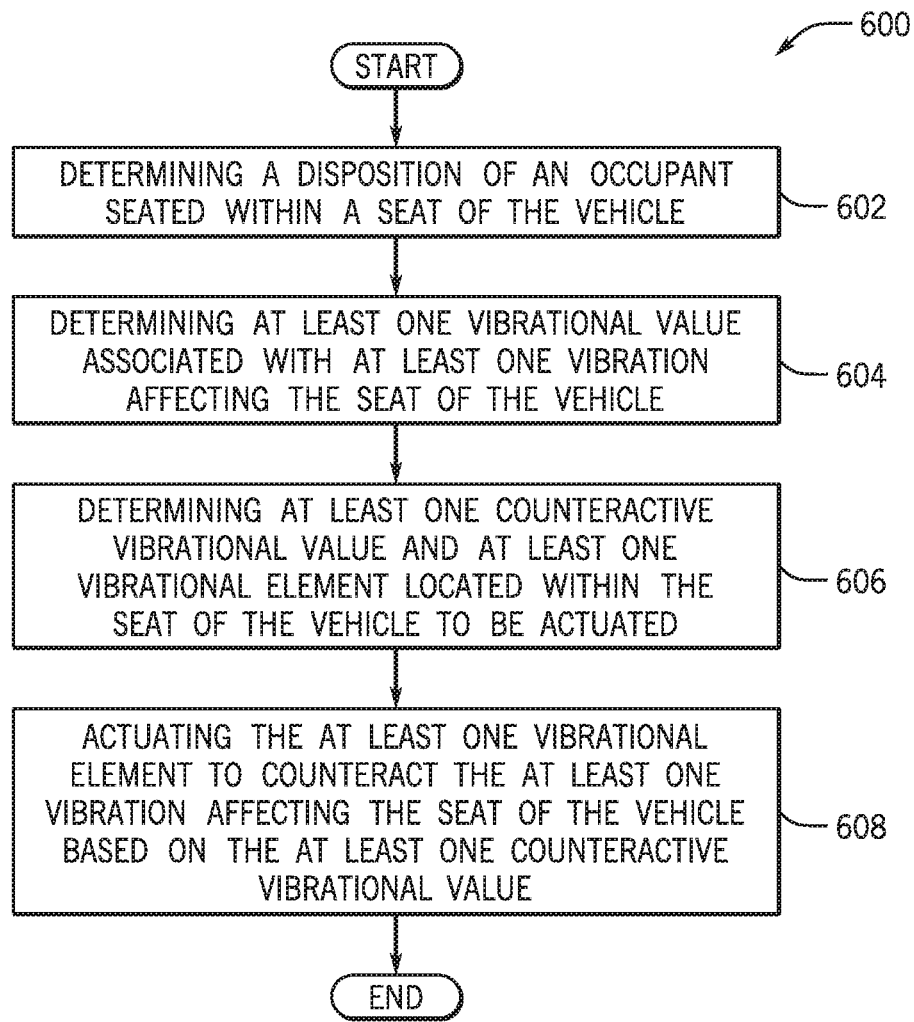
FIG. 6 is a process flow diagram of a method for counteracting vibrations within a vehicle according to an exemplary embodiment.

FIG. 6 is a process flow diagram of a method 600 for counteracting vibrations within a vehicle 102 according to an exemplary embodiment. FIG. 6 will be described with reference to the components of FIG. 1, though it is to be appreciated that the method 600 of FIG. 6 may be used with additional and/or alternative system components. The method 600 may begin at block 602, wherein the method 600 may include determining a disposition of an occupant 116 seated within a seat 110 of the vehicle 102.

The method 600 may proceed to block 604, wherein the method 600 may include determining at least one vibrational value associated with at least one vibration affecting the seat 110 of the vehicle 102. The method 600 may proceed to block 606, wherein the method 600 may include determining at least one counteractive vibration value and at least one vibrational element 120 located within the seat 110 of the vehicle 102 to be actuated. The method 600 may proceed to block 608, wherein the method 600 may include actuating the at least one vibrational element 120 to counteract the at least one vibration affecting the seat 110 of the vehicle 102 based on the at least one counteractive vibrational value.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for counteracting vibrations within a vehicle, comprising:

determining a disposition of an occupant seated within a seat of the vehicle;

determining at least one vibrational value associated with at least one vibration affecting the seat of the vehicle;

determining at least one counteractive vibrational value that is associated with at least one region of the seat as a corresponding inverse value of the at least one vibrational value and determining at least one vibrational element located within the at least one region of the seat to be actuated at a particular counteractive vibrational level based on the at least one counteractive vibrational value; and actuating the at least one vibrational element to provide counteractive vibrations at the particular counteractive vibrational level to counteract the at least one vibration affecting the seat of the vehicle based on the at least one counteractive vibrational value, wherein the counteractive vibrations are applied at a counteractive vibrational force to the at least one region of the seat based on an amount of weight that is applied to each region of the seat.

2. The computer-implemented method of claim 1, wherein determining the disposition of the occupant includes receiving sensor data and image data upon determining that the occupant is seated within the seat, wherein the sensor data and the image data is aggregated into sensor-image data.

3. The computer-implemented method of claim 2, wherein determining the disposition of the occupant includes analyzing the aggregated sensor-image data and determining at least one positional parameter value that corresponds to at least one seated position of the occupant and a weight of the occupant applied towards the at least one region of the seat.

4. The computer-implemented method of claim 3, wherein determining the disposition of the occupant includes querying a code lookup table to retrieve at least one predetermined code value that corresponds to the at least one positional parameter value, wherein the at least one predetermined code value is mapped to the disposition based on a description of the at least one predetermined code value, wherein a disposition map that includes data that maps a plurality of predetermined code values to dispositions associated with each occupant's body within the seat is accessed and the disposition of the occupant is determined.

5. The computer-implemented method of claim 1, wherein determining the at least one vibrational value includes receiving vibration data from vehicle vibration determinant sensors and analyzing the vibration data to determine the at least one vibrational value, wherein the at least one vibrational value is included within a range of values that represent vibration velocity, acceleration, and displacement that pertains to the at least one region of the seat.

6. The computer-implemented method of claim 5, wherein determining the at least one vibrational value includes analyzing the vibration data to determine vehicular vibrations and road vibrations, wherein the vehicular vibrations include vibrations caused by an operation of the vehicle and the road vibrations include vibrations caused by an unevenness of a roadway on which the vehicle is traveling.

7. The computer-implemented method of claim 1, wherein determining the at least one counteractive vibrational value and the at least one vibrational element located within the seat includes evaluating the disposition of the occupant and determining at least one region of the seat of the vehicle in which the occupant is seated that is located within a predetermined proximity of at least one area of the occupant's body.

8. The computer-implemented method of claim 1, wherein actuating the at least one vibrational element includes communicating a command to the at least one vibrational element that is configured as an eccentric rotating mass element to provide the counteractive vibrations, wherein the counteractive vibrations are provided at a level that counteracts the at least one vibration in the vehicle.

9. A system for counteracting vibrations within a vehicle, comprising:
a memory storing instructions when executed by a processor cause the processor to:
determine a disposition of an occupant seated within a seat of the vehicle;
determine at least one vibrational value associated with at least one vibration affecting the seat of the vehicle;
determine at least one counteractive vibrational value that is associated with at least one region of the seat as a corresponding inverse value of the at least one vibrational value and determining at least one vibrational element located within the at least one region of the seat to be actuated at a particular counteractive vibrational level based on the at least one counteractive vibrational value; and
actuate the at least one vibrational element to provide counteractive vibrations at the particular counteractive vibrational level to counteract the at least one vibration affecting the seat of the vehicle based on the at least one counteractive vibrational value, wherein the counteractive vibrations are applied at a counteractive vibrational force to the at least one region of the seat based on an amount of weight that is applied to each region of the seat.

10. The system of claim 9, wherein determining the disposition of the occupant includes receiving sensor data and image data upon determining that the occupant is seated within the seat, wherein the sensor data and the image data is aggregated into sensor-image data.

11. The system of claim 10, wherein determining the disposition of the occupant includes analyzing the aggregated sensor-image data and determining at least one positional parameter value that corresponds to at least one seated position of the occupant and a weight of the occupant applied towards the at least one region of the seat.

12. The system of claim 11, wherein determining the disposition of the occupant includes querying a code lookup table to retrieve at least one predetermined code value that corresponds to the at least one positional parameter value, wherein the at least one predetermined code value is mapped to the disposition based on a description of the at least one predetermined code value, wherein a disposition map that includes data that maps a plurality of predetermined code values to dispositions associated with each occupant's body within the seat is accessed and the disposition of the occupant is determined.

13. The system of claim 9, wherein determining the at least one vibrational value includes receiving vibration data from vehicle vibration determinant sensors and analyzing the vibration data to determine the at least one vibrational value, wherein the at least one vibrational value is included within a range of values that represent vibration velocity, acceleration, and displacement that pertains to the at least one region of the seat.

14. The system of claim 13, wherein determining the at least one vibrational value includes analyzing the vibration data to determine vehicular vibrations and road vibrations, wherein the vehicular vibrations include vibrations caused by an operation of the vehicle and the road vibrations include vibrations caused by an unevenness of a roadway on which the vehicle is traveling.

15. The system of claim 9, wherein determining the at least one counteractive vibrational value and the at least one vibrational element located within the seat includes evaluating the disposition of the occupant and determining at least one region of the seat of the vehicle in which the occupant is seated that is located within a predetermined proximity of at least one area of the occupant's body.

16. The system of claim 9, wherein actuating the at least one vibrational element includes communicating a command to the at least one vibrational element that is configured as an eccentric rotating mass element to provide the counteractive vibrations, wherein the counteractive vibrations are provided at a level that counteracts the at least one vibration in the vehicle.

17. A non-transitory computer readable storage medium storing instructions that when executed by a computer, which includes a processor perform a method, the method comprising:
determining a disposition of an occupant seated within a seat of a vehicle;
determining at least one vibrational value associated with at least one vibration affecting the seat of the vehicle;
determining at least one counteractive vibrational value that is associated with at least one region of the seat as a corresponding inverse value of the at least one vibrational value and determining at least one vibrational element located within the at least one region of the seat to be actuated at a particular counteractive vibrational level based on the at least one counteractive vibrational value; and
actuating the at least one vibrational element to provide counteractive vibrations at the particular counteractive vibrational level to counteract the at least one vibration affecting the seat of the vehicle based on the at least one counteractive vibrational value, wherein the counteractive vibrations are applied at a counteractive vibrational force to the at least one region of the seat based on an amount of weight that is applied to each region of the seat.

18. The non-transitory computer readable storage medium of claim 17, wherein actuating the at least one vibrational element includes communicating a command to the at least one vibrational element that is configured as an eccentric rotating mass element to provide the counteractive vibrations, wherein the counteractive vibrations are provided at a level that counteracts the at least one vibration in the vehicle.

* * * * *